May 23, 1972  E. A. TROIANO  3,664,637
TROTLINE GUIDE

Filed Sept. 1, 1970  2 Sheets-Sheet 1

INVENTOR
EMILIO A. TROIANO

BY Robert M. Wohlfarth

ATTORNEYS

May 23, 1972     E. A. TROIANO     3,664,637

TROTLINE GUIDE

Filed Sept. 1, 1970     2 Sheets-Sheet 2

INVENTOR
EMILIO A. TROIANO

BY *Robert M. Wohlfarth*

ATTORNEYS

United States Patent Office 3,664,637
Patented May 23, 1972

3,664,637
TROTLINE GUIDE
Emilio A. Troiano, 718 Sherbrook Drive,
Silver Spring, Md. 20904
Filed Sept. 1, 1970, Ser. No. 68,717
Int. Cl. B66d 1/36
U.S. Cl. 254—190 R
7 Claims

ABSTRACT OF THE DISCLOSURE

A guide to be mounted on a boat to pick up and guide a trotline to a convenient point on the boat to facilitate the removal of the catch from the trotline. The guide utilizes a horizontal roller and a pair of vertical rollers to maintain the trotline in position in the guide once the line is picked up and placed therein. In addition to preventing the loss of the trotline from the guide, the three rollers permit the boat to smoothly traverse the length of the trotline without causing a loss of the catch due to snagging or other discontinuity as the line passes through the guide.

BACKGROUND OF THE INVENTION

Field of the invention

The invention relates to a guide that is used to guide and support a trotline at a position within easy reach of a fisherman who is tending or working the trotline. When fishing or crabbing with a trotline the line must be periodically retrieved to remove the catch and to check and replenish the bait. This retrieval operation must be done without disturbing the moorings of the trotline and ideally be a smooth operation so as not to disturb the catch. The smoothness and continuity of the retrieval operation facilitates and removes the fatigue from this operation that must be repeated many times during a working day. To enable the trotline to be retrieved smoothly and continuously the line passes over and is supported by a horizontal roller. The trotline is maintained in position on the horizontal roller by a pair of vertical rollers through which the trotline passes. The boat is then propelled along the length of the trotline with the line being progressively picked up and passed through the guide. Thus the catch can be removed by the fisherman at some convenient position throughout the retrieval process, the line and bait can be freely passed through without disturbance, and the catch of fish or shellfish on the yet to be retrieved trotline will not be shaken off.

Description of the prior art

The environment in which a trotline guide is used lends itself to a variety of guide devices to achieve the pickup of the trotline.

The most widespread method of retrieval of a trotline is a hand-over-hand lifting and pulling of the trotline up out of the water to the boat. This requires a careful coordination of boat speed and manual dexterity of the man handling the line. By its very nautre this is a strenuous method and should be performed by two men.

Other devices used to retrieve and guide a trotline employ a smoothly contoured chock. These chocks are usually U-shaped or toroid with the line passing through the chock. This produces much friction between the wet line and the guide, as well as a periodic snag or pull as the bait passes through the chock. The friction caused by the drawing of the wet line through the chock also contributes to greater wear and reduced life of the trotline. The chock guide has generally proven to be unsatisfactory.

Where rollers are used with trotlines there is usually a single horizontal roller over which the trotline passes. This does in fact raise the trotline to a convenient height but it cannot be considered a guide since the fisherman must manually guide the line to insure that it remains in position on the roller. The roller merely functions as a non-friction point of pickup, and is unsatisfactory since if the fisherman should be less than attentive and the trotline line slips off the roller it will either jam in the roller mounting and break the line or fall into the water requiring a recapturing of the line. Some of these roller devices have employed an additional vertical roller or pin, but these also cannot be considered a true guide, since the line can slip off the end of the roller removed from the vertical roller or pin. In addition to the fouling of the trotline in the roller mechanism when it slips off the roller, there is the ever present danger with these devices requiring manual tending, of snagging of the fisherman when baited hooks are utilized on the trotline.

SUMMARY OF THE INVENTION

This invention employs a series of three rollers to provide a frictionless support and guide to be used during the retrieval of a trotline. There is a horizontal roller over which the trotline is passed to lift and support the line out of the water at a convenient working level. A pair of vertical rollers maintain the line therebetween in position on the horizontal roller and obviate the need of manual guiding to maintain the line in proper position. This elimination of the need to lift and/or guide a trotline during the retrieval cycle enables a single fisherman to service the trotline, i.e. remove the catch and check and replenish the bait. The rollers also provide a non-friction contact surface for the line thus reducing wear on the line and the possibility of entanglement of the bait. The structure of the guide is simple and rugged and can therefore withstand prolonged and heavy useage.

DESCRIPTION OF THE INVENTION

Figure 1:
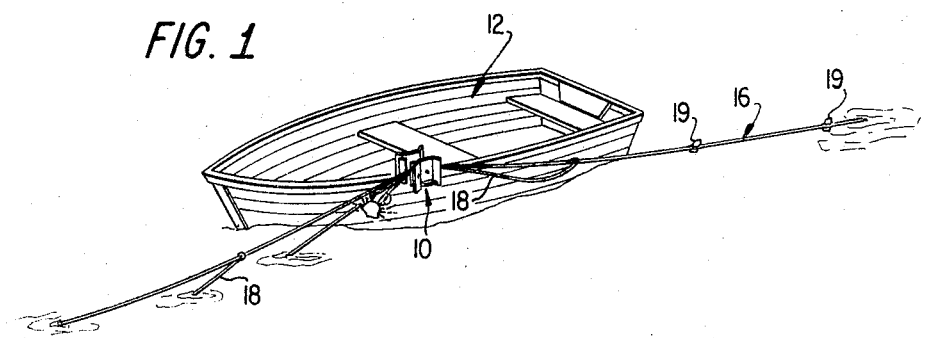
FIG. 1 is a panoramic view of the subject invention installed on the gunwhale of a boat.
Figure 2:
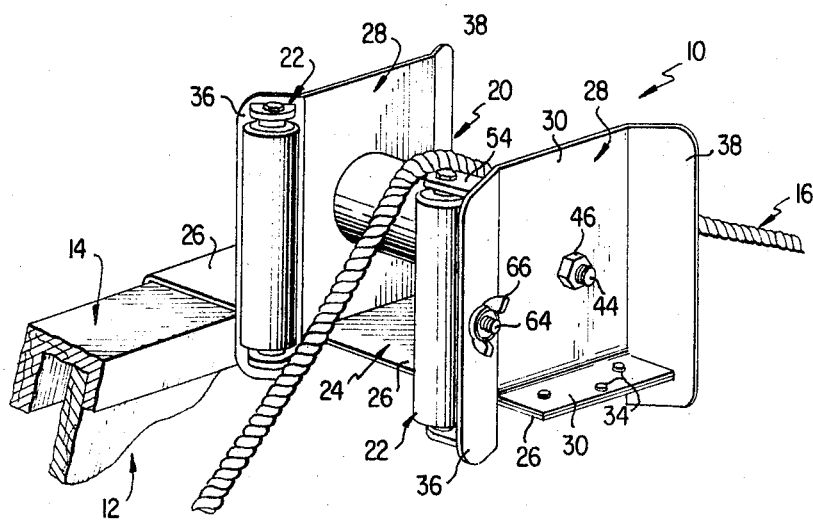
FIG. 2 is an enlarged perspective view of the subject invention.

Referring now to the drawings, especially FIG. 1, a trotline guide 10 is shown in position on a boat 12. The guide 10 is affixed to the gunwhale 14 of the boat 12 so that the guide extends over the water. The trotline 16 is illustrated on the left in the figure with a series of trots or drops 18. Another well known type of trotline is shown on the right in the figure, where the line 16 is momentarily unbraided and a piece of bait inserted between the strands and then allowed to twist back into position as shown at 19. These are the two most commonly used trotlines, and as set forth hereinafter, and are compatible with the guide 10.

The trotline guide 10 incorporates two roller assemblies, a main or horizontal roller assembly 20 and a pair of auxiliary or vertical roller assemblies 22. The main or horizontal roller assembly 20 serves to lift the trotline and support it at working height while the auxiliary or vertical roller assemblies 22 serve to guide the line and maintain it in position on the main roller assembly.

The main or horizontal roller assembly 20 is supported on a base assembly 24. The base assembly 24 has a main member 26 which extends in a generally horizontal direction with a pair of perpendicular stanchions 28 attached thereto in spaced relation. The stanchions 28 have a vertical section 30 and a horizontally extending section 32 at the lower edge thereof. A series of rivets or screws 34 are passed through the horizontal section 32 and the main member 26 to fix the stanchions in position on the base. The stanchions 28 include a vertical flange 36 which extends forwardly for the vertical sections 30 and at an outwardly divergent angle thereto. Thus the flanges 36 form a flared opening to the guide 10, as can best be seen in FIG. 4. Another pair of flanges 38 extend rearwardly from the vertical sections 30 of the stanchions 28. The flanges 38 diverge outwardly to the rear, thereby forming a flared exit from the guide 10, which is similar to but opposite in direction to the flared opening formed by the flanges 36.

The main or horizontal roller assembly 20 has a main roller 40 which is an elongated cylindrical member with ends 42 thereon. The roller 40 is mounted for rotation about a horizontal axis on a shaft 44. The shaft 44 extends through openings in the ends 42 of the roller 40 and openings in the vertical sections 30 of the stanchions 28. In the embodiment shown the shaft 44 is an elongated bolt with a nut 46 threaded on the end thereof to retain the main roller 40 in assembled relation between the stanchions. The length of the roller 40 is slightly less than the width of the space between the sections 30 of the stanchions so that when the roller is in position therebetween there will be no appreciable space between the ends 42 of the roller and the stanchions where the line 16 could snag or bind. To insure that the main roller 40 rotates freely and without friction on the line 16 passing thereover, ball or roller bearings can be installed in the ends 42 to receive the shaft 44.

The auxiliary or vertical roller assemblies are mounted on the vertical flanges 36 that form the flared opening to the guide 10. The assemblies 22 have a generally U shaped member 50 that has a base section 52 and a vertically extending section 54 at each end thereof. The auxiliary roller assemblies 22 have a roller 56 which is an elongated cylindrical member with ends 58. The roller 56 is journalled for rotation on a shaft 60. The shaft 60 extends through openings in the ends 58 of the roller, and openings in the vertical sections 54 of the members 50. In the embodiment shown the shaft 60 is an elongated bolt with a nut 62 threaded on the end thereof to retain the roller 56 in assembled relation on the member 50. The auxiliary roller assemblies 22 are adjustably attached to the flanges 36 by means of a threaded shaft 64 fixed to the back of the base section 52 at the midpoint thereof. The shaft 64 extends through an opening in the flange 36 and is retained in position by a wingnut 66 threaded onto the portion of the shaft 64 extending beyond the back of the flange 36. The pivotally adjustable mounting of the roller assemblies 22 on the guide 10 permits the roller 56 to be angled about a horizontal axis to accommodate the trotline 16 at whatever angle it may approach the opening to the guide.

Figure 3:
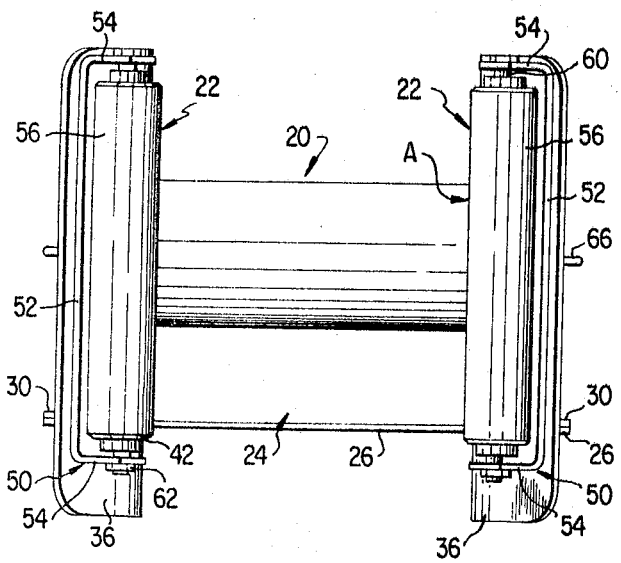
FIG. 3 is a front elevation view of the subject guide.
Figure 4:
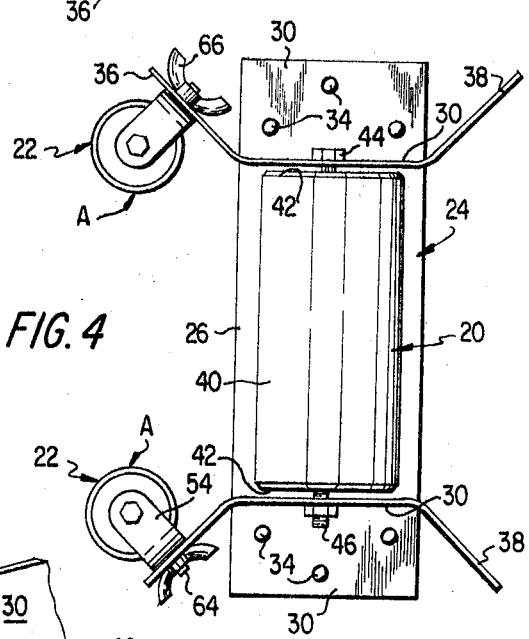
FIG. 4 is a top plan view of the subject invention.
Figure 5:
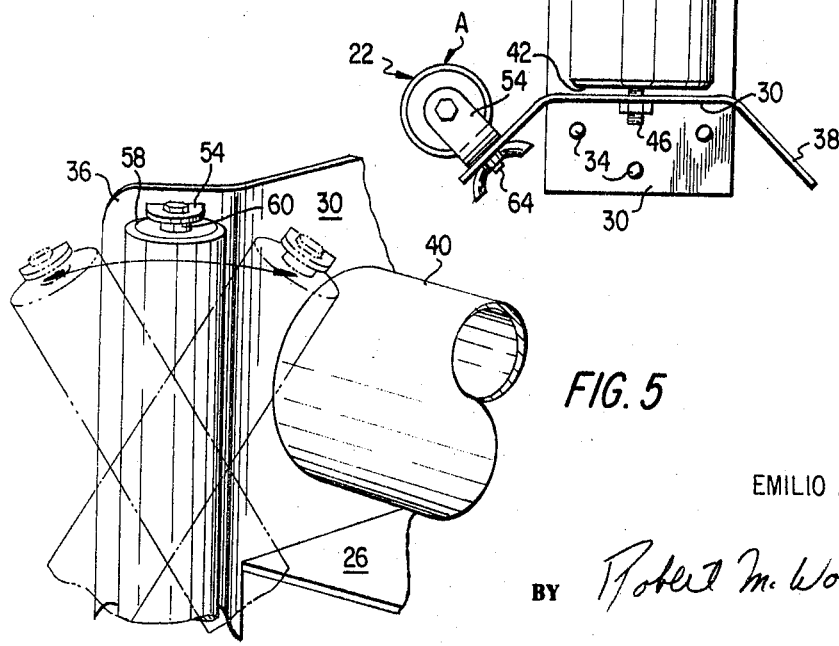
FIG. 5 is an enlarged partial view of the detail of the adjustable vertical roller assembly.

The utilization of the guide 10 is relatively simple and straightforward. With the guide attached to the gunwhale of the boat 12 and extending over the water, as shown in FIG. 1, the trotline 16 is picked up and placed on the main roller assembly 20 and maintained in place thereon by the two auxiliary roller assemblies 22. As can be seen in FIGS. 3 and 4 the innermost point A on the circumference of the auxiliary rollers 56 are well inside the ends 42 of the main roller 40. Thus the trotline 16 is maintained on the main roller 40 and cannot slip into the space between the ends 42 of the roller 40 and the vertical sections 30 of the stanchions 28 to bind or snag and possibly break the line. Therefore, the boat can progress along the length of the trotline without manual guiding by the fisherman and without fear of losing the line back over the side of the boat or of snagging and breaking the line. As shown in FIG. 1, as the boat 12 progresses from right to left along the length of the trotline 16, the line is raised out of the water by the progress of the boat along the line. The line, passing over the roller 40 permits smooth transversal of the line. If the path of the boat is not parallel to and aligned with the extent of the line the auxiliary rollers 56 maintain the line on the main roller 40 without undue friction. Also, regardless of how severe an angle the line approaches the opening to the guide the rollers 56 can accommodate the entry, or be adjusted to insure proper entry. With the positioning and use of the main and auxiliary rollers the guide can be used with equal efficiency with various types of trotlines. As mentioned above, these include the type using trots or drops 18, whether with hooks or without, and those where the line is momentarily unbraided and the bait inserted therein as shown at 19.

The simple but unique and rugged construction of the guide permits quick and easy placement of the trotline in the guide with certain and sure guidance of the line as the boats traverses the line. The guide also accepts any of the trotlines without modification or loss of efficiency. The simplicity and ruggedness also insure long use under adverse conditions. While the guide's very simplicity lends itself to adaptations, such is to be considered within the spirit and scope of the invention.

What is claimed is:

1. A guide for a trotline, comprising: a mounting plate, a pair of stanchions fixed to the mounting plate in spaced, generally perpendicular relationship thereto, a cylindrical roller journalled for rotation along an axis parallel to the plate, and a pair of cylindrical rollers one each being journalled for rotation on means pivotally mounted on the stanchions for adjustment about a horizontal axis.

2. The device of claim 1 wherein the upright rollers are mounted on the stanchions in a position forward of the horizontal roller.

3. The device of claim 1 wherein the pivotal mounting means are generally U shaped brackets with the rollers journalled between the parallel legs thereof.

4. The device of claim 1 wherein the upright rollers are mounted on the stanchions with the innermost point on the circumference thereof being spaced inwardly of the ends of the horizontal roller.

5. The device of claim 1 wherein the stanchions have an upright section at the forward end which extends angularly outward from the horizontal roller.

6. The device of claim 5 wherein the pivotally mounted means are mounted on the angular section of the stanchions for adjustment about a horizontal axis.

7. The device of claim 6 wherein the upright rollers are mounted on the angular sections of the stanchions with the innermost point on the circumference thereof being spaced inwardly of the ends of the horizontal roller.

References Cited
UNITED STATES PATENTS

| | | | |
|---|---|---|---|
| 2,783,025 | 2/1957 | Scheidt | 254—190 |
| 1,438,394 | 12/1922 | Packer | 254—190 |
| 1,727,071 | 9/1929 | Lovell | 254—137 |

EVON C. BLUNK, Primary Examiner

J. D. CHERRY, Assistant Examiner

U.S. Cl. X.R.

254—137